United States Patent Office.

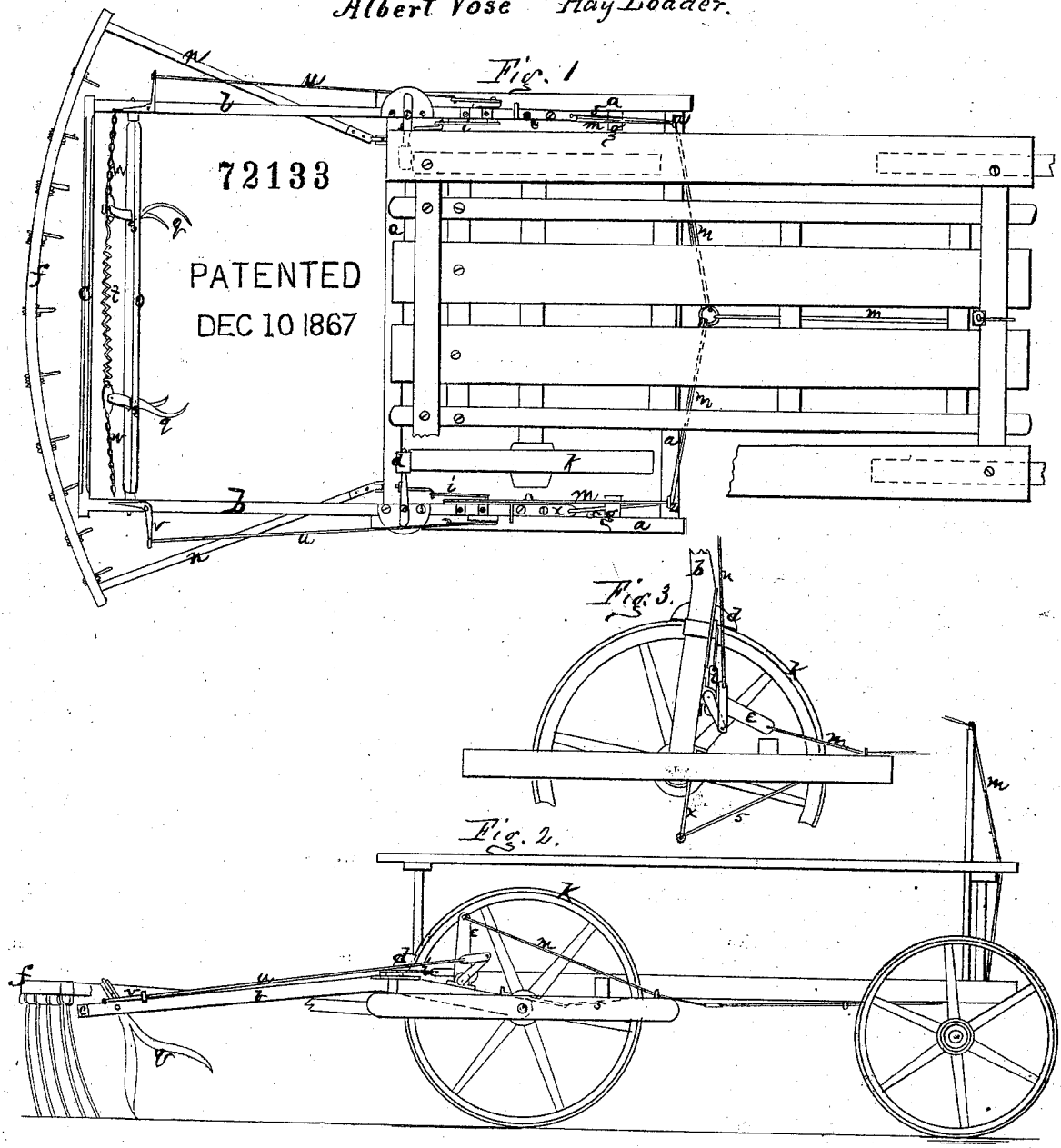

ALBERT VOSE, OF PITTSFIELD, ASSIGNOR TO HIMSELF AND AMBROSE S. VOSE, OF RANDOLPH, VERMONT.

*Letters Patent No. 72,133, dated December 10, 1867.*

IMPROVEMENT IN HAY-RAKERS AND LOADERS.

*The Schedule referred to in these Letters Patent and making part of the same.*

REISSUED.

TO ALL WHOM IT MAY CONCERN:

Be it known that I, ALBERT VOSE, of the town of Pittsfield, in the county of Rutland, in the State of Vermont, have invented a new and useful Machine for Loading Hay; and I do hereby declare that the following is a full, clear, and exact description of the construction and operation of the same, reference being had to the annexed drawings, making a part of this specification.

The nature of my invention consists in the construction of a machine for loading hay from the windrow, constructed to originate its power from friction-blocks attached to the two arms of the fork, connected with the two rear wheels of any common hay-wagon to which it may be attached, and be operated by a combination of levers and ropes connecting the fork with the rear wheels, and gathering the hay with the semicircular rake, in such a manner as to load the hay very fast; the machine to be managed and controlled by the driver on the load.

To enable others skilled in the art to make and use my invention, I will proceed to describe its construction and operation.

Figure 1 is a plan or top view of a hay-wagon, having my improved hay-loader attached, the wagon-body or rack being partly broken away, for the purpose of more clearly showing the arrangement of the parts of the loading-attachment.

Figure 2 is a side elevation of the same; and

Figure 3 is also a side elevation, showing the fork-carrier arms thrown up into a vertical position, for loading the hay upon the wagon, as hereinafter explained.

I construct my machine as follows: I attach to any common hay-wagon a square frame of wood, represented by $a\ a\ a\ a$, fig. 1, to the under side of the body, fastened to it by four iron bolts, the ends of the frame $a\ a$ passing the outside of the rear wheels opposite the ends of the axle. To this I attach the whole machine, so that it may be taken off when desired. To this frame, on the inside, opposite the centre of motion of the wheels, I attach the arms $b\ b$, on each side of the wagon, by a small axle, $j$, made fast in the frame $a\ a$, so that the centre of the motion of the arms $b\ b$ corresponds with that of the wheels $k\ k$. I connect the outer ends of the arms $b\ b$ by the bar of wood $c$. To each of these arms $b\ b$ I attach the friction-blocks $d\ d$ with a loose belt, so that they may be drawn against the wheels by the lever $e$, being connected with it by the rod $i$, the lever $e$ being operated by the rope $m$, which is attached to its longest arm, and passes down through the rings $z\ z$, and connects together, and passes on the under side of the body and up to the driver's stake, where he can operate it at pleasure. I also attach the ropes 5 to the arm $x\ x$, for the purpose of throwing back the fork after it is raised. The rope 5 is attached to rope $m$ in such a way that, when the fork is up, the end of rope $m$, attached to lever $e$, is slack, and rope 5 is tight; hence a slight pull by the driver throws the fork back upon the hay, and rope 5 is made loose, and rope $m$ is tight; then a pull by the driver at rope $m$ throws on the friction-blocks $d\ d$, and shuts the forks upon the hay, by means of the rods $u$, levers $v$, and chains $w$, which connect them with lever $e$ and rope $m$. The hay is thus grasped by the forks, and the friction-blocks $d$ being simultaneously applied to the wheels, the arms $b$, upon which said blocks are mounted, turning upon the same centre with the wheels, are fastened thereto, and, by the rotation of the wheels, as the machine is drawn forward, are raised into a vertical or nearly vertical position, (see fig. 3,) carrying the loaded fork with them, until the lever $e$ strikes the projecting arm or stop $g$, and is thrown back, loosening the friction-blocks $d\ d$, and releasing the forks $q\ q$, which are thrown open by the spring $t$, dropping the hay upon the load, leaving the fork ready to be thrown back, by rope 5, upon the hay, which is gathered by rake $f$.

I will next describe the forks $q\ q$, which are attached to the freely-revolving cross-piece $o$, by means of the loose bolts $s\ s$, so as to open and shut upon the hay. The forks $q\ q$ are thrown open by the coil-spring $t$, by which they are connected at the top, and are connected to the right-angled levers $v\ v$ by the chains $w\ w$. The levers $v\ v$ are connected with the levers $e\ e$ by the rods $u\ u$, so that when the friction-blocks $d\ d$ are thrown upon the wheels by ropes $m\ m$, the forks $q\ q$ shut up to the position shown by the dotted lines, and made fast in the hay, there remaining until levers $e\ e$ are thrown back by the blocks $g\ g$. The rods $u\ u$ and $i\ i$ are so attached to levers $e\ e$ as to form an eccentric, so that, when rope $m$ pulls them in position to work the fork, the friction-block is made fast to the wheel, and the fork will be kept shut until levers $e\ e$ are thrown back by blocks $g\ g$, as will be seen at figs. 2 and 3.

The rake $f$ is made in a semicircular form, (with spiral teeth,) so as to gather the hay to the centre, ready for the fork, and is attached to the frame $a\ a$ by the arms $n\ n$, by a loose joint that may be easily detached, operating just in rear of the fork, thus combining the forks $g\ g$ with the semicircular rake $f$, to operate substantially as described.

Claims.

What I claim as my invention, and desire to secure by Letters Patent, is—

1. The fork-arm $b$, hinged or pivoted to the frame in line with the axle, and operated by means of friction-blocks, as described.

2. The friction-blocks $d$, in combination with fork-arm $b$ and eccentric-levers $e$, arranged as described.

3. The fork-arms $b$, in combination with the freely-swivelling fork-bar $o$, operated as described.

4. The forks $q$, pivoted in swivelling-bar $o$, and operated by means of levers $v$, and rods, cords, or chains, substantially as described.

5. The levers $v$, mounted on fork-bars or arms $b$, in combination with the fork $q$, substantially as described.

6. The combination of forks $q$, spring $t$, chains $w$, and levers $v$, with the fork-arm $b$, substantially as and for the purpose set forth.

7. The means for opening and closing the lifting-forks, in combination with a means for operating the friction-blocks, or their equivalent, whereby they are operated simultaneously, as described.

8. The lever $e$, for closing the forks and applying the friction-blocks, as described, in combination with the arms $g$, for releasing the same, as described.

9. The extension $x$ of the pivoted fork-bars $b$, in combination with cords or chains 5, operating as described.

10. The curved or semicircular rake-head, or its equivalent, arranged in rear of and operated in connection with the lifting-fork, substantially as described.

ALBERT VOSE.

Witnesses:
 LYMAN GIBBS,
 CHARLES GIBBS.